United States Patent
Pannell et al.

(10) Patent No.: US 8,089,907 B2
(45) Date of Patent: Jan. 3, 2012

(54) DUPLEX MISMATCH DETECTION

(75) Inventors: Donald Pannell, Cupertino, CA (US); Ozdal Barkan, Mountain View, CA (US)

(73) Assignee: Marvell World Trade Ltd., St. Michael (BB)

( * ) Notice: Subject to any disclaimer, the term of this patent is extended or adjusted under 35 U.S.C. 154(b) by 1120 days.

(21) Appl. No.: 11/523,389

(22) Filed: Sep. 19, 2006

(65) Prior Publication Data

US 2007/0183349 A1    Aug. 9, 2007

Related U.S. Application Data

(60) Provisional application No. 60/771,559, filed on Feb. 8, 2006, provisional application No. 60/786,477, filed on Mar. 28, 2006.

(51) Int. Cl.
*H04B 1/44* (2006.01)

(52) U.S. Cl. ........ 370/282; 370/276; 370/293; 370/294; 370/295; 370/296; 370/395.53; 370/445; 370/447; 709/220; 709/221; 709/222; 709/227; 709/228; 709/237; 709/250

(58) Field of Classification Search ............... 370/445, 370/447, 450–452, 276–296, 395.53; 709/220–222, 709/227–229, 237, 250
See application file for complete search history.

(56) References Cited

U.S. PATENT DOCUMENTS

| 6,580,697 | B1 | 6/2003 | Gardner et al. |
| 6,665,275 | B1 * | 12/2003 | Davy et al. .................... 370/282 |
| 2006/0005102 | A1 | 1/2006 | Scaglione et al. |
| 2006/0280132 | A1 | 12/2006 | Connor |

FOREIGN PATENT DOCUMENTS

GB    2 355 373 A    4/2001

OTHER PUBLICATIONS

Network Computing, Ethernet Error Description, Nov. 15, 1996, Network Computing.*
Oppenheimer et al., Troubleshooting Campus Networks, 2002, John Wiley and Sons, p. 65-68.*
ANSI/IEEE Std 802.11, 1999 Edition; Information technology— Telecommunications and information exchange between systems— Local and metropolitan area networks—Specific requirements—Part 11: Wireless LAN Medium Access Control (MAC) and Physical Layer (PHY) Specifications; LAN/MAN Standards Committee of the IEEE Computer Society; 531 pages, Aug. 20, 1999.

(Continued)

*Primary Examiner* — Aung S Moe
*Assistant Examiner* — Hoon J Chung

(57) ABSTRACT

An apparatus including a port to transmit first frames and receive second frames over a communication channel, the port including a collision detect circuit and a duplex mismatch circuit. The collision detect circuit detects collisions on the communication channel between the first frames and the second frames. The duplex mismatch circuit declares a duplex mismatch when the communication channel was established without attempting auto-negotiation, the port is in a half-duplex mode, and the collision detect circuit detects a very late collision involving one of the first frames. The very late collision occurs after a predetermined amount of data has been transmitted in the one of the first frames. The duplex mismatch indicates that a full-duplex mode is used with respect to the second frames.

16 Claims, 4 Drawing Sheets

OTHER PUBLICATIONS

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) Physical Layer (PHY) specifications High-speed Physical Layer in the 5 GHz Band; LAN/MAN Standards Committee of the IEEE Computer Society; 91 pages, Sep. 16, 1999.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11b-1999/Cor 1-2001 (Corrigendum to IEEE Std 802.11-1999); IEEE Standard for Information technology—Telecommunications and information exchange between systems—Local and metropolitan area newtorks—Specific requirements—Part 11: Wireless LAN Medium Access Control (MAC) and Physical Layer (PHY) specifications Amendment 2: Higher-Speed Physical Layer (PHY) extension in the 2.4 GHz Band—Corrigendum 1; LAN/MAN Standards Committee of the IEEE Computer Society; Nov. 7, 2001; 23 pages.

IEEE P802.11g/D8.2, Apr. 2003 (Supplement to ANSI/IEEE Std 802.11-1999(Reaff 2003)); DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

802.11n; IEEE P802.11-04/0889r6; Wireless LANs, TGn Sync Proposal Technical Specifications; 134 pages, May 18, 2005.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE P 802.20 V 14, Jul. 16, 2004, Draft 802.20 Permanent Document, System Requirements for IEEE 802.20 Mobile Broadband Wireless Access Systems—Version 14, 24 pages.

IEEE Std 802.3-2002 (Revisiion of IEEE 802.3, 2000 Edition); IEEE Standard for Information technology—Telecommunications and information exchange between systems—local and metropolitan area networks—Specific requirements Part 3: Carrier sense multiple access with collison detection (CSMA/CD) access method and physical layer specifications; Section One; IEEE Computer Society; Sponsored by the LAN/MAN Standards Committee; Mar. 8, 2002; 578 pages.

IEEE Std 802.3-2002 (Revisiion of IEEE 802.3, 2000 Edition); IEEE Standard for Information technology—Telecommunications and information exchange between systems—local and metropolitan area networks—Specific requirements Part 3: Carrier sense multiple access with collison detection (CSMA/CD) access method and physical layer specifications; Section Two; IEEE Computer Society; Sponsored by the LAN/MAN Standards Committee; Mar. 8, 2002; 582 pages.

IEEE Std 802.3-2002 (Revisiion of IEEE 802.3, 2000 Edition); IEEE Standard for Information technology—Telecommunications and information exchange between systems—local and metropolitan area networks—Specific requirements Part 3: Carrier sense multiple access with collison detection (CSMA/CD) access method and physical layer specifications; Section Three; IEEE Computer Society; Sponsored by the LAN/MAN Standards Committee; Mar. 8, 2002; 379 pages.

PCT International Search Report and Written Opinion dated Sep. 17, 2007 for International Application No. PCT/US2007/004095; 14 pages.

Office Action issued in the corresponding Chinese Patent Application No. 200780019972.3, dated May 5, 2011, 14 pages.

* cited by examiner

DUPLEX MISMATCH DETECTION

CROSS-REFERENCE TO RELATED APPLICATIONS

This application claims the benefit of U.S. Provisional Patent Applications Ser. No. 60/771,559 filed Feb. 8, 2006 and Ser. No. 60/786,477 filed Mar. 28, 2006, the disclosure thereof incorporated by reference herein in its entirety.

BACKGROUND

The present invention relates generally to data communication. More particularly, the present invention relates to duplex mismatch detection in data communication channels.

SUMMARY

In general, in one aspect, the invention features an apparatus comprising: at least one port to transmit first frames of data in half-duplex mode, and to receive second frames of the data, over a communication channel, wherein the at least one port comprises a collision detect circuit to detect collisions on the communication channel between the first frames of the data and the second frames of the data; and a duplex mismatch circuit to declare a duplex mismatch when the collision detect circuit detects a predetermined number of late collisions involving the first frames of the data, wherein each of the late collisions occurs after a first predetermined amount of the data has been transmitted in the respective first frame of the data; or the collision detect circuit detects a very late collision involving one of the first frames of the data, wherein the very late collision occurs after a second predetermined amount of the data has been transmitted in the one of the first frames of the data, wherein the second predetermined amount of the data is greater than the first predetermined amount of the data; and wherein the duplex mismatch indicates that a full-duplex mode is used with respect to the second frames of the data.

In some embodiments, at least one of the predetermined amounts of the data is selected according to a size of a collision domain of the communication channel. In some embodiments, at least one of the predetermined amounts of the data is selected according to multiple of a size of a collision domain of the communication channel. In some embodiments, the duplex mismatch circuit declares the duplex mismatch by performing at least one action including: setting a flag in a memory circuit or transmitting a message or both. In some embodiments, the at least one port further comprises: a duplex mode circuit to change the at least one port from half-duplex mode to full-duplex mode when the duplex mismatch circuit declares a duplex mismatch. Some embodiments comprise a network device incorporating the apparatus, wherein the network device is compliant with at least one of a plurality of standards including IEEE standards 802.3, 802.11, 802.11a, 802.11b, 802.11g, 802.11n, 802.16, and 802.20. Some embodiments comprise a network device incorporating the apparatus, wherein the network device includes one of: a switch; a router; and a network interface controller.

In general, in one aspect, the invention features an apparatus comprising: at least one port means for transmitting first frames of data in half-duplex mode, and for receiving second frames of the data, over a communication channel, wherein the at least one port means comprises collision detect means for detecting collisions on the communication channel between the first frames of the data and the second frames of the data; and duplex mismatch means for declaring a duplex mismatch when the collision detect means detects a predetermined number of late collisions involving the first frames of the data, wherein each of the late collisions occurs after a first predetermined amount of the data has been transmitted in the respective first frame of the data; or the collision detect means detects a very late collision involving one of the first frames of the data, wherein the very late collision occurs after a second predetermined amount of the data has been transmitted in the one of the first frames of the data, wherein the second predetermined amount of the data is greater than the first predetermined amount of the data; and wherein the duplex mismatch indicates that a full-duplex mode is used with respect to the second frames of the data.

In some embodiments, at least one of the predetermined amounts of the data is selected according to a size of a collision domain of the communication channel. In some embodiments, at least one of the predetermined amounts of the data is selected according to multiple of a size of a collision domain of the communication channel. In some embodiments, the duplex mismatch means declares the duplex mismatch by performing at least one action including: setting a flag in a memory circuit or transmitting a message or both. In some embodiments, the at least one port means further comprises: duplex mode means for changing the at least one port means from half-duplex mode to full-duplex mode when the duplex mismatch means declares a duplex mismatch. Some embodiments comprise a network device incorporating the apparatus, wherein the network device is compliant with at least one of a plurality of standards including IEEE standards 802.3, 802.11, 802.11a, 802.11b, 802.11g, 802.11n, 802.16, and 802.20. Some embodiments comprise a network device incorporating the apparatus, wherein the network device includes one of: a switch; a router; and a network interface controller.

In general, in one aspect, the invention features a method comprising: transmitting first frames of data in half-duplex mode, and receiving second frames of the data, over a communication channel; detecting collisions on the communication channel between the first frames of the data and the second frames of the data; and declaring a duplex mismatch when a predetermined number of late collisions involving the first frames of the data are detected, wherein each of the late collisions occurs after a first predetermined amount of the data has been transmitted in the respective one of the first frames of the data; or a very late collision involving one of the first frames of the data is detected, wherein the very late collision occurs after a second predetermined amount of the data has been transmitted in the one of the first frames of the data, wherein the second predetermined amount of the data is greater than the first predetermined amount of the data; and wherein the duplex mismatch indicates that a full-duplex mode is used with respect to the second frames of the data.

In some embodiments, at least one of the predetermined amounts of the data is selected according to a size of a collision domain of the communication channel. In some embodiments, at least one of the predetermined amounts of the data is selected according to multiple of a size of a collision domain of the communication channel. In some embodiments, declaring the duplex mismatch comprises performing at least one of: setting a flag in a memory circuit and transmitting a message. Some embodiments comprise transmitting the first frames of the data in full-duplex mode after declaring a duplex mismatch.

In general, in one aspect, the invention features a computer program executable on a processor, comprising: instructions for detecting collisions on a communication channel between first frames of data transmitted in half-duplex mode over the communication channel and second frames of the data received over the communication channel; and instructions for declaring a duplex mismatch when a predetermined number of late collisions involving the first frames of the data are detected, wherein each of the late collisions occurs after a first predetermined amount of the data has been transmitted in the respective one of the first frames of the data; or a very late collision involving one of the first frames of the data is detected, wherein the very late collision occurs after a second predetermined amount of the data has been transmitted in the one of the first frames of the data, wherein the second predetermined amount of the data is greater than the first predetermined amount of the data; and wherein the duplex mismatch indicates that a full-duplex mode is used with respect to the second frames of the data.

In some embodiments, at least one of the predetermined amounts of the data is selected according to a size of a collision domain of the communication channel. In some embodiments, at least one of the predetermined amounts of the data is selected according to multiple of a size of a collision domain of the communication channel. In some embodiments, the instructions for declaring the duplex mismatch comprise instructions for performing at least one of: setting a flag in a memory circuit and causing transmission of a message.

In general, in one aspect, the invention features an apparatus comprising: at least one port to transmit first frames of data in full-duplex mode, and to receive second frames of the data, over a communication channel, wherein the at least one port comprises one or both of a cyclic redundancy check (CRC) error detect circuit to detect CRC errors in the second frames of the data, and a fragment detect circuit to detect fragments of the second frames of the data; and a duplex mismatch circuit to declare a duplex mismatch when the CRC error detect circuit detects a CRC error in one of the second frames of the data when the at least one port is transmitting one of the first frames of the data, or the fragment detect circuit detects a fragment of one of the second frames of the data, or both; and wherein the duplex mismatch indicates that a half-duplex mode is used with respect to the second frames of the data.

In some embodiments, the duplex mismatch circuit declares the duplex mismatch by performing at least one action including: setting a flag in a memory circuit or transmitting a message or both. In some embodiments, the at least one port further comprises: a duplex mode circuit to change the at least one port from full-duplex mode to half-duplex mode when the duplex mismatch circuit declares a duplex mismatch. In some embodiments, the at least one port further comprises: a collision forcing circuit to cause the at least one port to transmit one of the first frames of the data while receiving one of the second frames of the data after receiving a predetermined amount of the data in the one of the second frames of the data in response to the duplex mismatch circuit declaring a duplex mismatch. Some embodiments comprise a duplex mode circuit to change the at least one port from full-duplex mode to half-duplex mode when the duplex mismatch circuit declares a duplex mismatch after the collision forcing circuit causes the at least one port to transmit the one of the first frames of the data. Some embodiments comprise a network device incorporating the apparatus, wherein the network device is compliant with at least one of a plurality of standards including IEEE standards 802.3, 802.11, 802.11a, 802.11b, 802.11g, 802.11n, 802.16, and 802.20. Some embodiments comprise a network device incorporating the apparatus, wherein the network device includes one of: a switch; a router; and a network interface controller.

In general, in one aspect, the invention features an apparatus comprising: at least one port means for transmitting first frames of data in full-duplex mode, and for receiving second frames of the data, over a communication channel, wherein the at least one port means comprises one or both of cyclic redundancy check (CRC) error detect means for detecting CRC errors in the second frames of the data, and fragment detect means for detecting fragments of the second frames of the data; and duplex mismatch means for declaring a duplex mismatch when the CRC error detect means detects a CRC error in one of the second frames of the data when the at least one port means is transmitting one of the first frames of the data, or the fragment detect means detects a fragment of one of the second frames of the data, or both; and wherein the duplex mismatch indicates that a half-duplex mode is used with respect to the second frames of the data.

In some embodiments, the duplex mismatch means declares the duplex mismatch by performing at least one action including: setting a flag in a memory circuit or transmitting a message or both. In some embodiments, the at least one port means further comprises: duplex mode means for changing the at least one port means from full-duplex mode to half-duplex mode when the duplex mismatch means declares a duplex mismatch. In some embodiments, the at least one port means further comprises: collision forcing means for causing the at least one port means to transmit one of the first frames of the data while receiving one of the second frames of the data after receiving a predetermined amount of the data in the one of the second frames of the data in response to the duplex mismatch means declaring a duplex mismatch. Some embodiments comprise duplex mode means for changing the at least one port means from full-duplex mode to half-duplex mode when the duplex mismatch means declares a duplex mismatch after the collision forcing means causes the at least one port means to transmit the one of the first frames of the data. Some embodiments comprise a network device incorporating the apparatus, wherein the network device is compliant with at least one of a plurality of standards including IEEE standards 802.3, 802.11, 802.11a, 802.11b, 802.11g, 802.11n, 802.16, and 802.20. Some embodiments comprise a network device incorporating the apparatus, wherein the network device includes one of: a switch; a router; and a network interface controller.

In general, in one aspect, the invention features a method comprising: transmitting first frames of data in full-duplex mode, and receiving second frames of the data, over a communication channel; declaring a duplex mismatch when a CRC error is detected in one of the second frames of the data when transmitting one of the first frames of the data, or a fragment of one of the second frames of the data is received, or both; and wherein the duplex mismatch indicates that a half-duplex mode is used with respect to the second frames of the data.

In some embodiments, declaring the duplex mismatch comprises performing at least one of a plurality of actions including: setting a flag in a memory circuit and transmitting a message. Some embodiments comprise transmitting the first frames of the data in full-duplex mode after declaring a duplex mismatch. Some embodiments comprise transmitting one of the first frames of the data while receiving one of the second frames of the data after receiving a predetermined amount of the data in the one of the second frames of the data after a duplex mismatch is declared. Some embodiments comprise transmitting the first frames of the data in full-duplex mode when a duplex mismatch is declared after transmitting the first one of the frames.

In general, in one aspect, the invention features a computer program executable on a processor, comprising: instructions for causing first frames of data to be transmitted in full-duplex mode over a communication channel, wherein second frames of the data are received over the communication channel; and instructions for declaring a duplex mismatch when a CRC error is detected in one of the second frames of the data when one of the first frames of the data is being transmitted, or a fragment of one of the second frames of the data is received, or both; and wherein the duplex mismatch indicates that a half-duplex mode is used with respect to the second frames of the data.

In some embodiments, the instructions for declaring the duplex mismatch comprise instructions for performing at least one of a plurality of actions including: setting a flag in a memory and transmitting a message. Some embodiments comprise instructions for causing the first frames of the data to be transmitted in half-duplex mode after a duplex mismatch is declared. Some embodiments comprise instructions for causing transmission of one of the first frames of the data while receiving one of the second frames of the data after receiving a predetermined amount of the data in the one of the second frames of the data after a duplex mismatch is declared. Some embodiments comprise instructions for causing the first frames of the data to be transmitted in half-duplex mode in response to declaring a duplex mismatch after transmitting the one of the first frames of the data.

The details of one or more implementations are set forth in the accompanying drawings and the description below. Other features will be apparent from the description and drawings, and from the claims.

Figure 1:
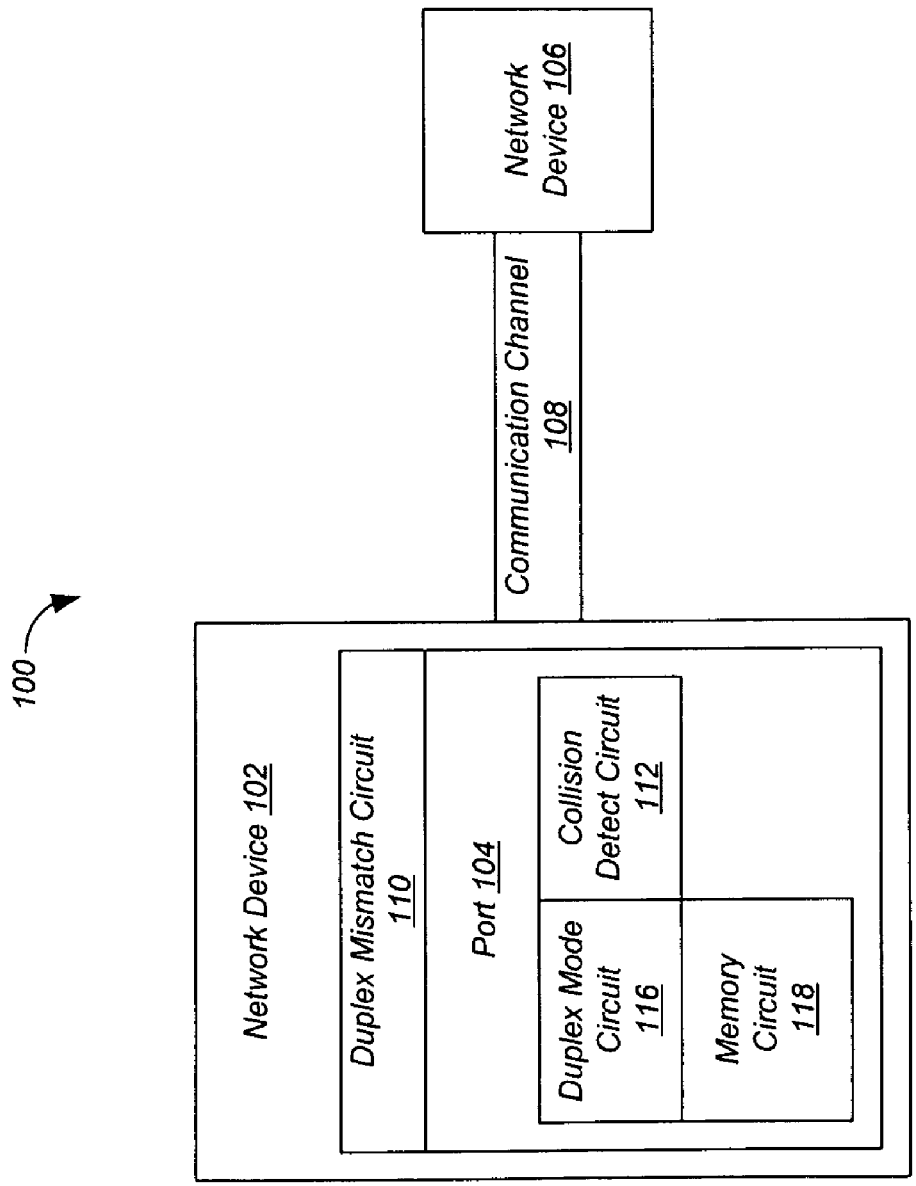
FIG. 1 shows a communication system comprising a network device capable of detecting and correcting duplex mismatch when in half-duplex mode according to a preferred embodiment of the present invention.

The leading digit(s) of each reference numeral used in this specification indicates the number of the drawing in which the reference numeral first appears.

DETAILED DESCRIPTION

The inventors have discovered that a condition known as "duplex mismatch" is far more common than expected. Performance on links having duplex mismatch is greatly reduced at best, and can involve port stalling problems at worst.

Duplex mismatch occurs when one link partner employs full-duplex mode while the other link partner on the link employs half-duplex mode. The port in half-duplex mode cannot send any data while the full duplex port is transmitting. Worse, the full duplex link will transmit whenever it wants, regardless of whether the half duplex port is currently transmitting, causing collisions and frame receiver errors on the frames the half duplex port is transmitting. Therefore very few frames transmitted by the half duplex port are successfully transmitted. Actual data transfer rates on duplex mismatch links have been measured at 1% of the capable rate of the link with TCP/IP traffic.

Duplex mismatch can occur quite easily due to how the IEEE standards that support category (CAT) 3, 5 and 5e twisted pair cables evolved. Initially the only twisted-pair Ethernet standard was 10BASE-T which was all half duplex using hubs. The possibility arose to increase network performance by supporting full duplex communications, but required a mechanism to allow full duplex only if both sides of a link indicate they can support full-duplex mode. This mechanism is called auto-negotiation.

Rules were developed to insure interoperability with existing equipment, for example, because 10BASE-T hubs did not support auto-negotiation. One such rule dictated that if a link partner does not auto-negotiate the local port must come up in half-duplex mode. This rule insures backwards compatibility with the original 10BASE-T hubs.

As technology evolved, Fast Ethernet (IEEE 100BASE-TX) became a standard. Again the first Fast Ethernet devices used to interconnect computers were half duplex Fast Ethernet hubs. These hubs cost less than (full duplex capable) switches, and due to the way Fast Ethernet was standardized, did not need to auto-negotiate. The mechanism that allowed for these hubs to be built without auto-negotiation is called "parallel detect." Parallel detect allows a port to link at the correct speed (10 or 100 Mbits/sec), even if the link partner does not auto-negotiate, by examining the idle patterns seen on the link, which differ for different speeds.

Even though auto-negotiation was well-defined in the IEEE standard, its complexity provoked concern that not all devices would complete auto-negotiation correctly. To address these interoperability concerns, the IEEE standard also allowed a port to be forced into a particular speed and duplex mode. This "back door" became quite useful as interoperability problems arose in the early days of auto-negotiation.

Each of these rules made sense as they evolved, but together they created the problem of duplex mismatch. For example, some older equipment requires that speed and duplex mode be forced, probably due to an auto-negotiation interoperability problem. Many network administrators remember this requirement and force the speed and duplex on some newer equipment for that reason, or in an attempt to obtain optimum performance. In either case, optimum performance is the desired goal, so when the duplex mode is forced, it is usually forced to full-duplex mode.

When a forced port is connected to an auto-negotiating port, the link will come up and packets will flow so that the link appears to be operating properly. However, the auto-negotiating port will come up in half-duplex mode due to the provisions of the IEEE standard. In reality the performance of the port is greatly reduced, and the problem is not apparent.

Table 1 shows the 6 possible combinations of speed and duplex mode on 10/100 links, and the effective bit rate for a file download using TCP/IP. Most network administrators consider only the first 4 entries in the table where duplex mismatch does not occur, and therefore consider forcing a port to 100 Mbit speed and full-duplex mode a good practice. But if the forcing is not done on the link partner's port as well (which is quite often not done) the effective bit rate of the link is actually less than that of a properly configured 10 Mbit half duplex link.

TABLE 1

| Link Speed | Duplex Mode | Effective Bit Rate |
| --- | --- | --- |
| 100 Mbit | Full | 100 Mbit |
| 100 Mbit | Half | ~50 Mbit |
| 10 Mbit | Full | 10 Mbit |
| 10 Mbit | Half | ~5 Mbit |
| 100 Mbit | Mismatch | ~1 Mbit |
| 10 Mbit | Mismatch | ~0.1 Mbit |

Embodiments of the present invention provide techniques for both ends of a link suffering from duplex mismatch to correct the duplex mismatch. According to some embodiments, the half-duplex end of the link can detect that the other end of the link is in full-duplex mode by detecting late and/or very late collisions, and can correct the duplex mismatch by changing to full-duplex mode. According to some embodiments, the full-duplex end of the link can detect that the other end of the link is in half-duplex mode by one or more techniques including detecting cyclic redundancy check (CRC) errors and frame fragments, and can correct the duplex mismatch by changing to half-duplex mode. In some embodiments, a device operating in full-duplex mode that detects a duplex mismatch forces one or more very late collisions to give the half-duplex link partner an opportunity to detect the duplex mismatch, and to change to full-duplex mode, for example using the techniques disclosed herein, thereby resolving the duplex mismatch. If the link partner does not change to full-duplex mode, the device changes to half-duplex mode to resolve duplex mismatch.

FIG. 1 shows a communication system 100 comprising a network device 102 capable of detecting and correcting duplex mismatch when in half-duplex mode according to a preferred embodiment of the present invention. Network device 102 can be implemented as a switch, router, network interface controller (NIC), and the like. Network device 102 comprises at least one port 104 for communicating with another network device 106 over a communication channel 108. Network device 102 also comprises a duplex mismatch circuit 110 to declare duplex mismatches, as described in detail below. In some embodiments, all or part of duplex mismatch circuit 110 is implemented in port 104. Port 104 comprises a collision detect circuit 112 to detect collisions on communication channel 108a duplex mode circuit 116 to change port 104 from half-duplex mode to full-duplex mode, and a memory circuit 118.

Figure 2:
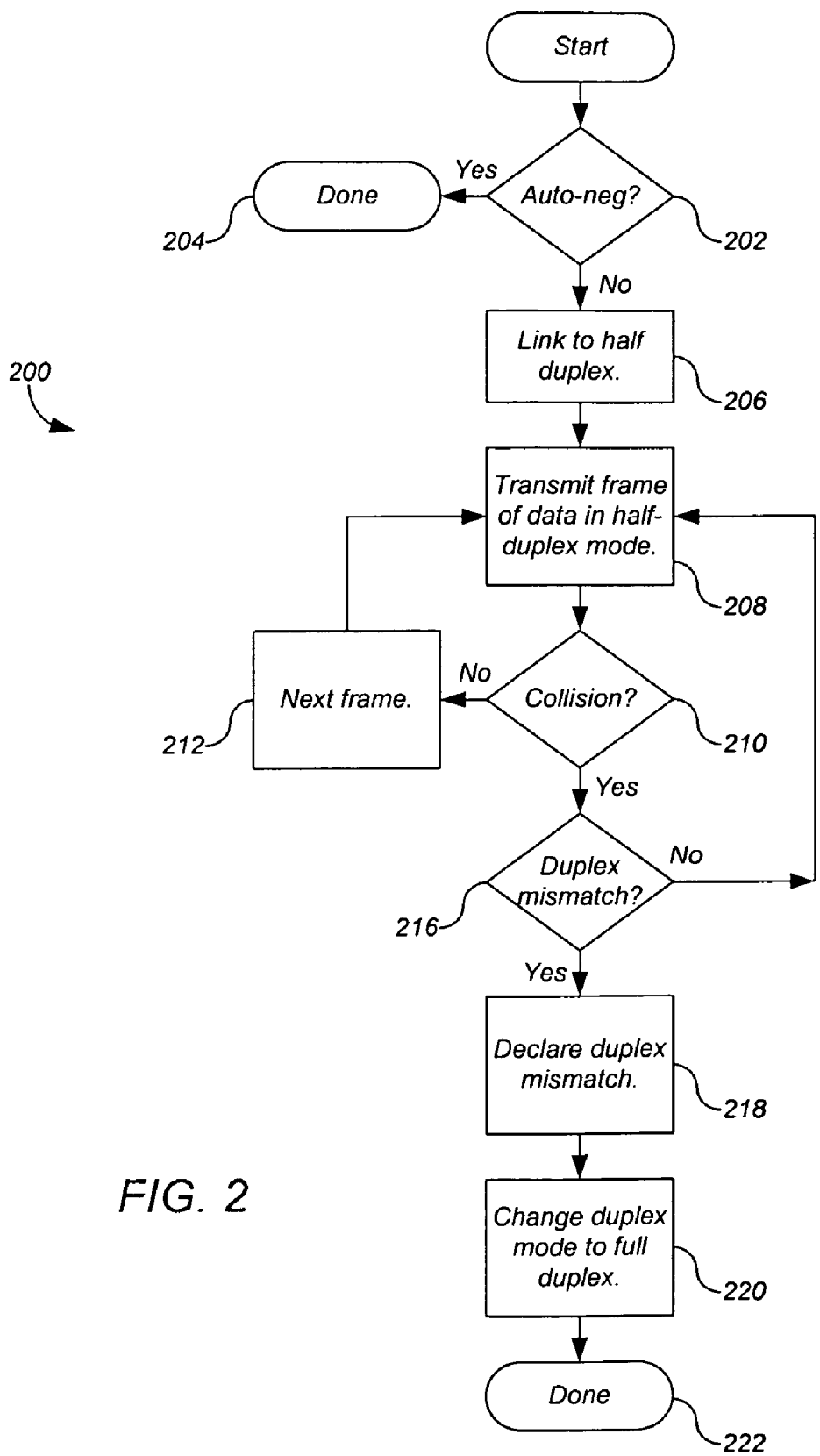
FIG. 2 shows a process for the network device of FIG. 1 according to a preferred embodiment of the present invention.

FIG. 2 shows a process 200 for network device 102 of FIG. 1 according to a preferred embodiment of the present invention. If the link between network devices 102 and 106 was established using auto-negotiation (step 202), process 200 is done (step 204) because there can be no duplex mismatch. Otherwise, port 104 links into half-duplex mode (step 206) and determines whether a duplex mismatch exists, that is, whether network device 106 is in full-duplex mode, as described below. Port 104 of network device 102 transmits frames of data, in half-duplex mode, to network device 106 over communication channel 108 (step 208). Because port 104 is in half-duplex mode, if network devices 102 and 106 transmit on communication channel 108 at the same time, a collision will occur, which will be detected by collision detect circuit 112, for example according to conventional techniques.

When no collision is detected (step 210), port 104 selects another frame of data (step 212) and transmits that frame over communication channel 108 (resuming at step 208). But when collision detect circuit 112 detects a collision (step 210), duplex mismatch circuit 110 determines whether a duplex mismatch has occurred (step 216).

In some embodiments, duplex mismatch circuit 110 determines that a duplex mismatch has occurred when a predetermined number of late collisions have occurred, for example during a predetermined interval. A late collision according to the IEEE 802 standard is a collision that occurs after a threshold amount of data in a frame has been transmitted. For example, late collisions in IEEE 802 have been used to determine when the collision domain of a network is too large. According to IEEE standard 802.3, any collision that occurs after byte 64 of a frame is considered a late collision. It is for this reason that the minimum frame size for an Ethernet frame was set at 64 bytes. When the collision domain was too large, the network device transmitting the frame might not detect a collision until after the frame has been transmitted, and so could erroneously assume the frame was successfully transmitted. Thus a late collision was defined so that oversized collision domains could be detected and corrected. In the oversized collision domain, late collisions typically occur at byte 65 or 66, with decreasing chances at each higher byte count. In fact, late collisions in an oversized collision domain are rare, as they happen only when two or more stations at or near the extreme ends of the collision domain try to transmit a frame at the same time.

In these embodiments, duplex mismatch circuit 110 determines whether a duplex mismatch should be declared (step 216) by determining whether the rate of late collisions (that is, the number of late collisions during a predetermined interval) exceeds a predetermined threshold rate. For example, 1,000 late collisions in the span of 10 seconds is probably sufficient to declare a duplex mismatch, especially if the system administrator previously defined that network device 102 is not connected to a large collision domain. Of course, other thresholds and intervals can be used.

In some embodiments, duplex mismatch circuit 110 determines that a duplex mismatch has occurred when a "very late" collision has occurred. Modem networks typically no longer use large collision domains because they are generally built with full-duplex switches instead of half-duplex hubs. Embodiments of the present invention employ these late collisions for a different purpose: to detect duplex mismatch. While the threshold amount of data defining a very late collision can be set at the size of the collision domain of communication channel 108, it is preferably set at some multiple thereof, for example four times the count of a late collision (that is, after 64 bytes), by defining a very late collision as a collision that occurs after byte 256 of a frame. Any such "very late" collision cannot be the result of a collision domain that is slightly too large, and therefore can only be an indicator of a duplex mismatch. Various embodiments employ one or both of these techniques, that is, the use of late and/or very late collisions, to determine whether duplex mismatch has occurred.

If duplex mismatch circuit 110 determines that no duplex mismatch has occurred (step 216), port 104 transmits the frame of data again after some interval (resuming at step 208).

However, if duplex mismatch circuit 110 determines that a duplex mismatch has occurred (step 216), duplex mismatch circuit 110 declares a duplex mismatch (step 218). In this case, declaring a duplex mismatch indicates that network device 106 is in full-duplex mode. Duplex mismatch circuit 110 can take one or more actions to declare a duplex mismatch. For example, duplex mismatch circuit 110 can set an appropriate flag in a Management Information Base (MIB) stored in memory circuit 118. As another example, duplex mismatch circuit 110 can transmit a message to a system administrator. In some embodiments, duplex mode circuit 116 changes port 104 to full-duplex mode (step 220) after declaring a duplex mismatch. Then process 200 is done (step 222).

Figure 3:
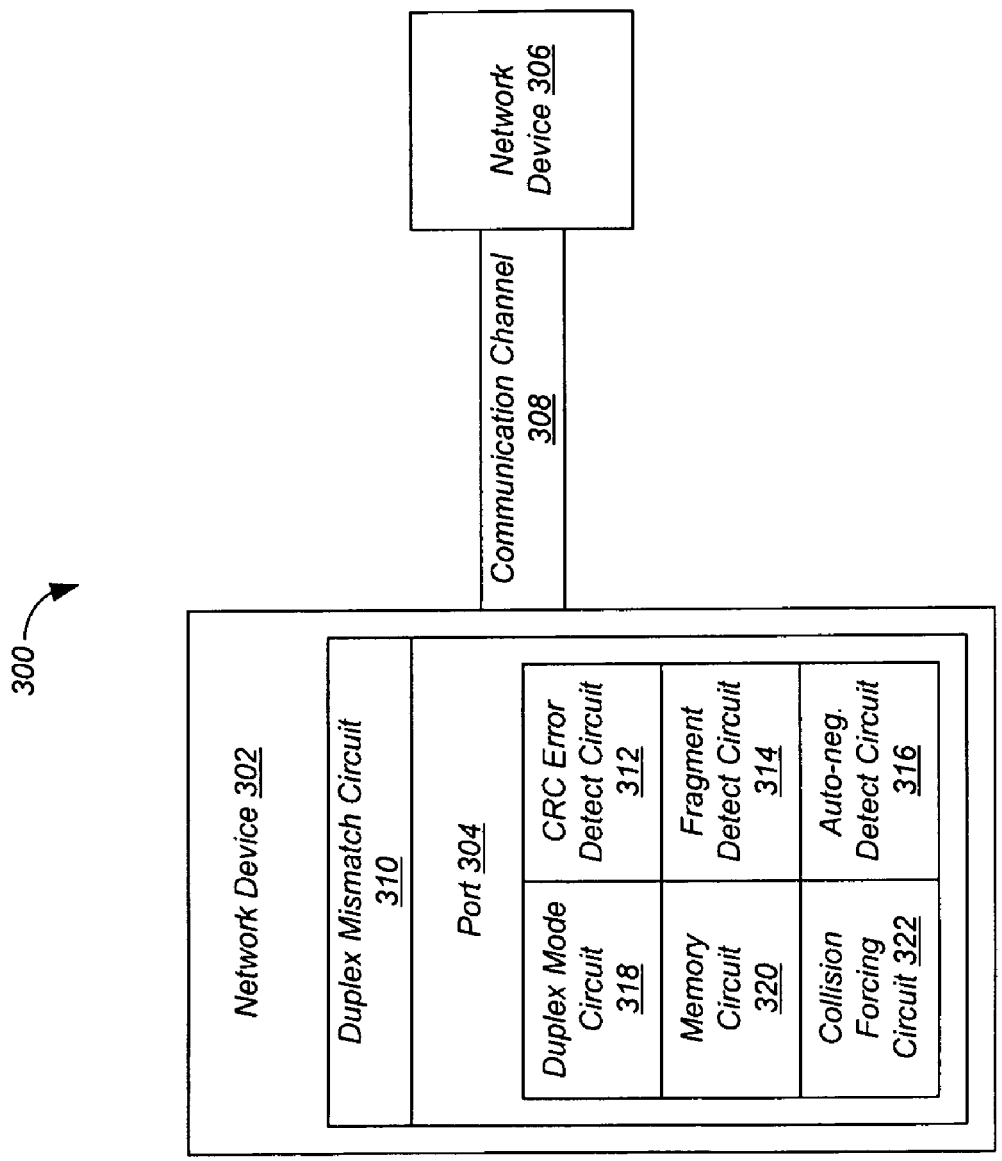
FIG. 3 shows a communication system comprising a network device capable of detecting and correcting duplex mismatch when in full-duplex mode according to a preferred embodiment of the present invention.

FIG. 3 shows a communication system 300 comprising a network device 302 capable of detecting and correcting duplex mismatch when in full-duplex mode according to a preferred embodiment of the present invention. Network device 302 can be implemented as a switch, router, network interface controller (NIC), and the like. Network device 302 comprises at least one port 304 for communicating with another network device 306 over a communication channel 308. Network device 302 also comprises a duplex mismatch circuit 310 to declare duplex mismatches, as described in detail below. Port 304 comprises a CRC error detect circuit 312 to detect CRC errors in received frames, and a fragment detect circuit 314 to detect fragments of the frames. Port 304 comprises a duplex mode circuit 318 to change port 304 from full-duplex mode to half-duplex mode, a memory circuit 320, and a collision forcing circuit 322 to force collisions on communication channel 308.

Figure 4:
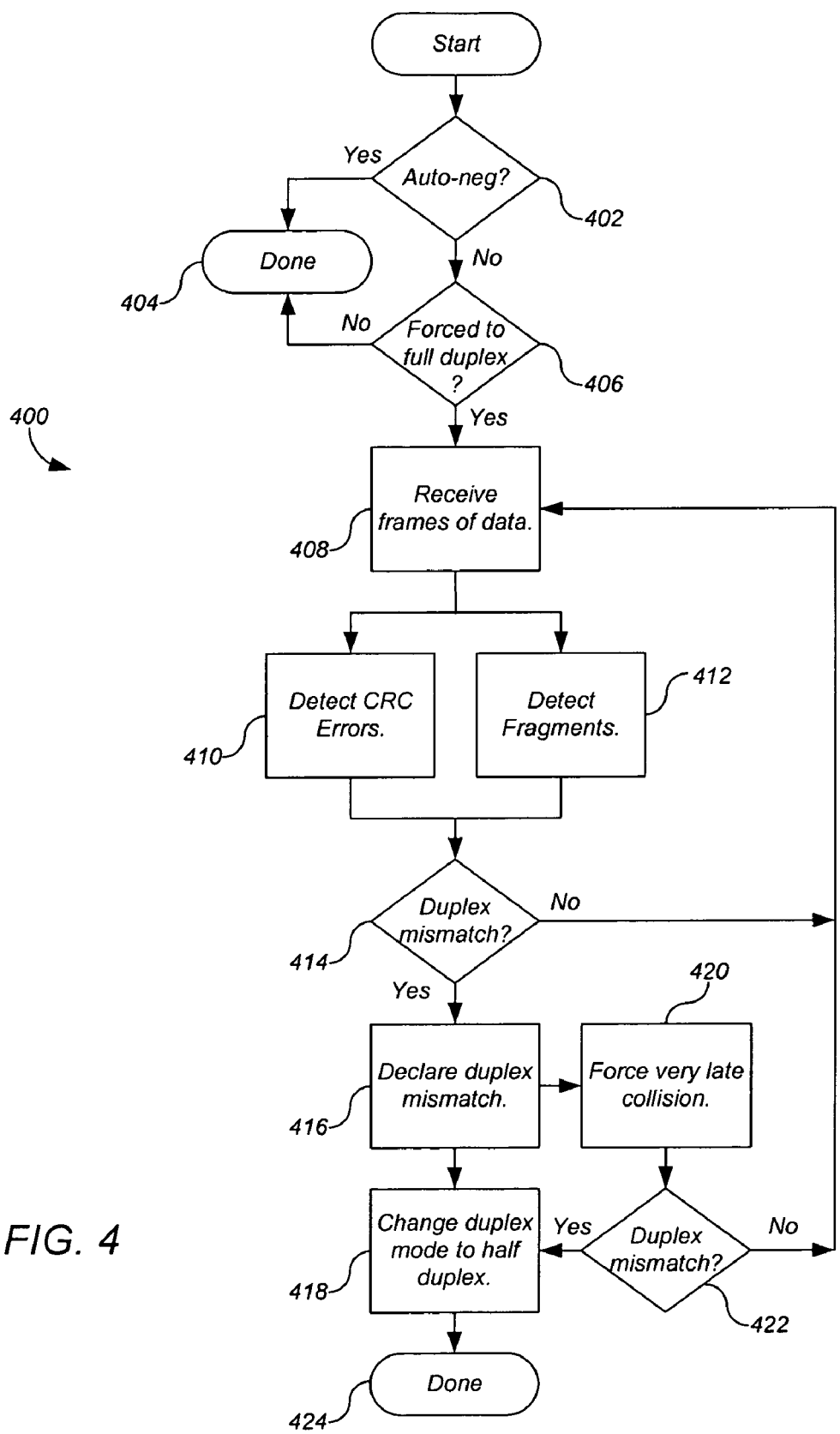
FIG. 4 shows a process for the network device of FIG. 3 according to a preferred embodiment of the present invention.

FIG. 4 shows a process 400 for network device 302 of FIG. 3 according to a preferred embodiment of the present invention. If the link between network devices 302 and 306 was established using auto-negotiation (step 402), process 400 is done (step 404) because there can be no duplex mismatch. If the link between network devices 302 and 306 was not established using auto-negotiation (step 402) and port 304 is not forced into full-duplex mode (step 406), process 400 is done (step 404). Otherwise process 400 determines whether a duplex mismatch exists, that is, whether network device 306 is in half-duplex mode.

To prevent the situation where both network devices 302, 306 try to switch duplex mode at the same time because they both operate according to embodiments of the present invention, network device 302 allows network device 306 time to switch duplex mode before changing its own duplex mode, as described below.

Port 304 of network device 302 then receives frames of data from network device 306 over communication channel 308 (step 408). CRC error detect circuit 312 detects any CRC errors in the received frames (step 410), for example that occur when port 304 starts transmitting a frame, which could indicate that collisions on communication channel 308 are corrupting the received frames. In some embodiments, when such a CRC error is detected, port 304 starts transmitting the preamble of a frame before byte 64 is received in the next frame entering port 304. This causes a fragment to be received and detected at port 304, as described below.

Fragment detect circuit 314 detects fragments of the received frames (step 412). Because fragments are not used in full-duplex mode, the presence of fragments on communication channel 308 indicates that network device 306 is operating in half-duplex mode.

Duplex mismatch circuit 310 determines whether a duplex mismatch should be declared (step 414) based on one or more of the conditions detected by CRC error detect circuit 312, fragment detect circuit 314, and the configuration of this feature by the network administrator. In this case, declaring a duplex mismatch indicates that network device 306 is in half-duplex mode.

If a duplex mismatch should be declared (step 414), duplex mismatch circuit 110 declares a duplex mismatch (step 416). Duplex mismatch circuit 310 can take one or more actions to declare a duplex mismatch. For example, duplex mismatch circuit 310 can set an appropriate flag in a Management Information Base (MIB) stored in memory circuit 320. As another example, duplex mismatch circuit 310 can transmit a message to a system administrator.

If duplex mismatch circuit 310 does not declare a duplex mismatch (step 414), port 304 continues receiving frames of data (resuming at step 408). But if duplex mismatch circuit 310 declares a duplex mismatch (step 416), in some embodiments duplex mode circuit 318 changes port 304 to half-duplex mode (step 418). Then process 400 is done (step 424). However, when network device 306 operates according to FIG. 2, network device 306 could change its duplex mode to full when port 304 is changing its duplex mode to half, again resulting in a duplex mismatch.

In other embodiments, if duplex mismatch circuit 310 declares a duplex mismatch (step 416), collision forcing circuit 322 forces one or more very late collisions on communication channel 308 (step 420), for example by transmitting a frame, or at least the preamble portion of a frame, while receiving a frame after receiving a predetermined amount of the data in the frame being received, thereby giving network device 306 an opportunity to detect the very late collision and change duplex mode to full-duplex mode, for example according to the techniques described above.

Duplex mismatch circuit 310 then monitors communication channel 308 again to determine whether another duplex mismatch has occurred (step 422), for example according to the techniques described above. If duplex mismatch circuit 310 does not detect a duplex mismatch (step 422), which would be the case if network device 306 had changed duplex mode to full-duplex mode, process 400 resumes at step 408. But if duplex mismatch circuit 310 detects another duplex mismatch (step 422), duplex mode circuit 318 changes port 304 to half-duplex mode (step 418). Then process 400 is done (step 424).

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory circuit and/or a random access memory circuit. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory circuit, including by way of example semiconductor memory circuit devices, such as EPROM, EEPROM, and flash memory circuit devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
   a port to transmit first frames and receive second frames over a communication channel, wherein the port comprises:
   a collision detect circuit to detect collisions on the communication channel between the first frames and the second frames; and
   a duplex mismatch circuit to declare a duplex mismatch when:
   the communication channel was established without attempting auto-negotiation,
   the port is in a half-duplex mode, and
   the collision detect circuit detects a very late collision involving one of the first frames, wherein the very late collision occurs after a predetermined amount of data has been transmitted in the one of the first frames, and
   wherein the duplex mismatch indicates that a full-duplex mode is used with respect to the second frames.

2. The apparatus of claim 1:
   wherein the predetermined amount of data is selected according to a size of a collision domain of the communication channel.

3. The apparatus of claim 1:
   wherein the predetermined amount of data is selected according to multiple of a size of a collision domain of the communication channel.

4. The apparatus of claim 1, wherein the duplex mismatch circuit declares the duplex mismatch by performing at least one action including:
   setting a flag in a memory circuit or transmitting a message or both.

5. The apparatus of claim 1, wherein the port further comprises:
   a duplex mode circuit to change the port from the half-duplex mode to the full-duplex mode when the duplex mismatch circuit declares the duplex mismatch.

6. A network device incorporating the apparatus according to claim 1, wherein the network device is compliant with at least one of a plurality of standards including IEEE standards 802.3, 802.11, 802.11a, 802.11b, 802.11g, 802.11n, 802.16, and 802.20.

7. A network device incorporating the apparatus according to claim 1, wherein the network device includes one of:
   a switch;
   a router; and
   a network interface controller.

8. A method comprising:
   transmitting first frames and receiving second frames over a communication channel at a port of a network device;
   detecting collisions on the communication channel between the first frames and the second frames; and
   declaring a duplex mismatch when:
   the communication channel was established without attempting auto-negotiation,
   the port is in a half-duplex mode, and
   a very late collision involving one of the first frames is detected, wherein the very late collision occurs after a predetermined amount of data has been transmitted in the one of the first frames, and
   wherein the duplex mismatch indicates that a full-duplex mode is used with respect to the second frames.

9. The method of claim 8:
   wherein the predetermined amount of data is selected according to a size of a collision domain of the communication channel.

10. The method of claim 8:
    wherein the predetermined amount of data is selected according to multiple of a size of a collision domain of the communication channel.

11. The method of claim 8, wherein declaring the duplex mismatch comprises performing at least one of:
    setting a flag in a memory circuit and
    transmitting a message.

12. The method of claim 8, further comprising:
    transmitting the first frames in the full-duplex mode after declaring the duplex mismatch.

13. A computer program stored on a computer-readable storage device and executed by a processor, the computer program comprising instructions for:
    detecting collisions between first frames transmitted and second frames received over a communication channel by a port of a network device; and
    declaring a duplex mismatch when:
    the communication channel was established without attempting auto-negotiation,
    the port is in a half-duplex mode, and
    a very late collision involving one of the first frames is detected, wherein the very late collision occurs after a predetermined amount of data has been transmitted in the one of the first frames, and
    wherein the duplex mismatch indicates that a full-duplex mode is used with respect to the second frames.

14. The computer program of claim 13:
    wherein the predetermined amount of data is selected according to a size of a collision domain of the communication channel.

15. The computer program of claim 13:
    wherein the predetermined amount of data is selected according to multiple of a size of a collision domain of the communication channel.

16. The computer program of claim 13, wherein the instructions for declaring the duplex mismatch comprise instructions for performing at least one of:
    setting a flag in a memory circuit and
    causing transmission of a message.

* * * * *